US006029697A

United States Patent [19]

Phillips et al.

[11] Patent Number: 6,029,697

[45] Date of Patent: Feb. 29, 2000

[54] AIR VENT FOR THE AUTO LIMITER

[75] Inventors: Paul E. Phillips, Whitehall, Mich.; Ian Taylor, South Woodford, United Kingdom

[73] Assignee: EBW, Inc., Muskegon, Mich.

[21] Appl. No.: 09/098,928

[22] Filed: Jun. 17, 1998

[51] Int. Cl.[7] .................... F16K 24/04

[52] U.S. Cl. .................... 137/592; 137/202

[58] Field of Search .................... 137/202, 448, 137/588, 592; 220/86.1, 86.2; 96/176

[56] References Cited

U.S. PATENT DOCUMENTS

| | | | |
|---|---|---|---|
| 1,155,070 | 9/1915 | Kessler . | |
| 2,935,991 | 5/1960 | Arutunoff . | |
| 3,171,448 | 3/1965 | Fromm | 141/293 |
| 3,485,266 | 12/1969 | Sieghartner | 137/588 |
| 3,530,882 | 9/1970 | Case et al. | 137/588 |
| 3,658,080 | 4/1972 | Mitchell . | |
| 3,807,465 | 4/1974 | Ginsburgh et al. | 141/285 |
| 3,908,718 | 9/1975 | Bower | 141/59 |
| 4,241,770 | 12/1980 | Robertson . | |
| 4,659,346 | 4/1987 | Uranishi et al. . | |
| 4,798,306 | 1/1989 | Giacomazzi et al. | 220/86 R |
| 4,881,578 | 11/1989 | Rich et al. | 141/44 |
| 4,932,444 | 6/1990 | Micek | 141/59 |
| 4,958,655 | 9/1990 | Danek | 137/202 |
| 4,963,169 | 10/1990 | Granville | 55/185 |
| 5,072,912 | 12/1991 | LeBlanc et al. | 251/63.5 |
| 5,141,019 | 8/1992 | LeBlanc et al. | 137/423 |
| 5,205,330 | 4/1993 | Sekine . | |
| 5,232,028 | 8/1993 | Sunderhaus et al. | 141/301 |
| 5,299,605 | 4/1994 | Bergamini et al. | 141/59 |
| 5,388,622 | 2/1995 | Philips | 141/198 |
| 5,538,039 | 7/1996 | Harde et al. | 137/592 |
| 5,668,308 | 9/1997 | Denby . | |
| 5,839,465 | 11/1998 | Phillips et al. | 137/448 |
| 5,899,227 | 5/1999 | Stuart | 137/592 |

FOREIGN PATENT DOCUMENTS

| | | |
|---|---|---|
| 2301347 | 12/1996 | United Kingdom . |
| WO9638375 | 12/1996 | WIPO . |

OTHER PUBLICATIONS

Piccolo Vapor Reduction System, © copyright 1997 Universal Valve Co., Inc., 10 pgs.

*Primary Examiner*—J. Casimer Jacyna
*Attorney, Agent, or Firm*—Young & Basile, P.C.

[57] ABSTRACT

A vent device connectible in a fill pipe of an underground fuel storage tank having a cylindrical housing with a drop tube and a J-shape tubular fitting with two open ends. The first open end is open within the drop tube and directed toward the underground fuel tank and the second open end is exposed through the wall of the cylindrical housing into an upper portion of the underground fuel storage tank. The tubular fitting has an expansion chamber vertically disposed between the two open ends for holding a float ball therein. The float ball is confined within the expansion chamber by a lower seat of the chamber and a barrier extending across the diameter of the chamber to prevent the float ball from sealing the upper seat of the chamber. Gaseous and liquid fluid may enter the first open end and flow through the second open end to the upper portion of the underground fuel storage tank; but the float ball blocks the first open end so gaseous and liquid fluid cannot enter into the drop tube from the upper portion of the underground fuel storage tank.

14 Claims, 2 Drawing Sheets

AIR VENT FOR THE AUTO LIMITER

FIELD OF THE INVENTION

The invention relates to a venting device for an underground storage fuel tank for venting the air ahead of a stream of fuel from a delivery truck at the start of delivery.

BACKGROUND OF THE INVENTION

The underground fuel tanks are filled from tank trucks by means of a large diameter hose which is sealingly coupled to the upper end of the fill pipe during the filling operation. Prior to delivery, the hose of the fuel truck traps a quantity of air therein. As a result, during delivery this quantity of air precedes the fuel flow into the underground fuel tank. Without a means for venting the air away from the fuel currently stored in the fuel tank, the air, as it enters and mixes with the fuel, causes underground fuel tank turbulence, increases foaming of fuel and increases vapor emissions.

Therefore, it is desirable to provide a device that addresses these concerns. Further, it is desirable to provide a device that is easily retrofitted in an existing drop tube and that can be easily installed with or without an automatic shutoff system currently disposed in the down tube. In addition, it is desirable to provide a device that prevents the vented air from returning to the fill pipe and escaping into the atmosphere.

SUMMARY OF THE INVENTION

According to the present invention, a venting device assembly is provided extending downward through the top of the underground fuel storage tank. The vent device is incorporated in and includes a cylindrical housing with a separate tubular passageway attached therein. The cylindrical housing can be mounted directly to the fill pipe which extends downward through the riser welded to the top of the storage tank. If an overfill protection valve is provided, the venting device is mounted downstream from and in alignment with the overfill protection valve. The cylindrical housing provides a fluid flow passageway in which the air and incoming fuel is directed downward. The density and pressure of the leading air stored ahead of the fuel will direct the air through the separate tubular passageway of the venting device instead of to the storage fuel tank.

The tubular passageway of the venting device is essentially a J-shaped tubular device having both ends open. The tubular device is attached along the inner wall of the cylindrical housing and has one end open and positioned through the cylinder wall. An opposing open end is directed downward toward the underground fuel tank. The tubular device provides a through passage for the air that enters the fill pipe to be directed through the open ends of the vent, through the cylinder wall, and into the upper portion of the underground tank. A center expansion chamber is located between the two open ends. A float ball is captured within the expansion chamber. The float ball is configured to allow gaseous and liquid fluid to pass from the fill pipe into the venting device but does not allow the gaseous and liquid fluid to pass from the upper portion of the underground tank into the fill pipe.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
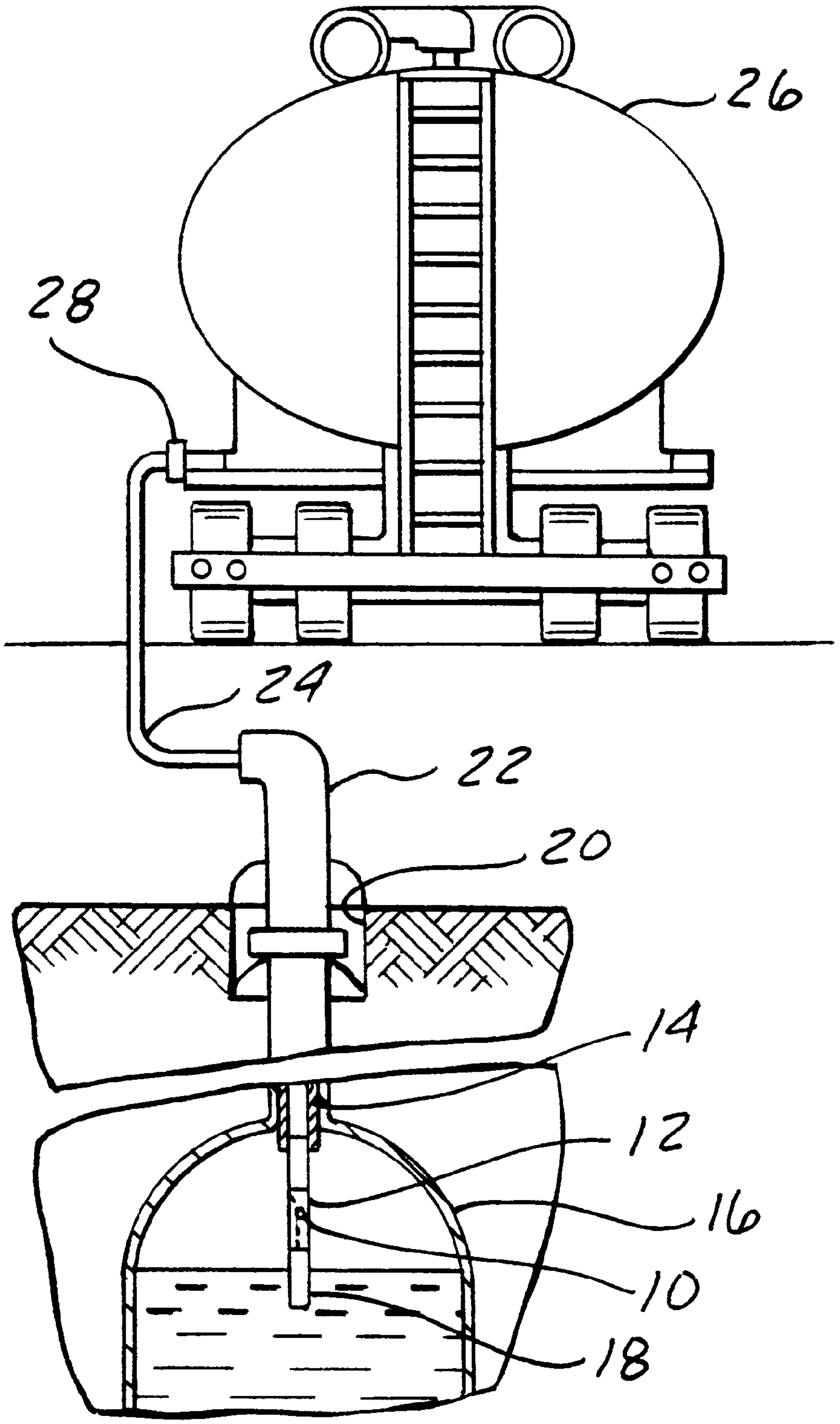
FIG. 1 is a schematic diagram, partially in cross-section of a tanker truck in the process of filling an underground storage tank and utilizing a vent device embodying the present invention.
Figure 3:
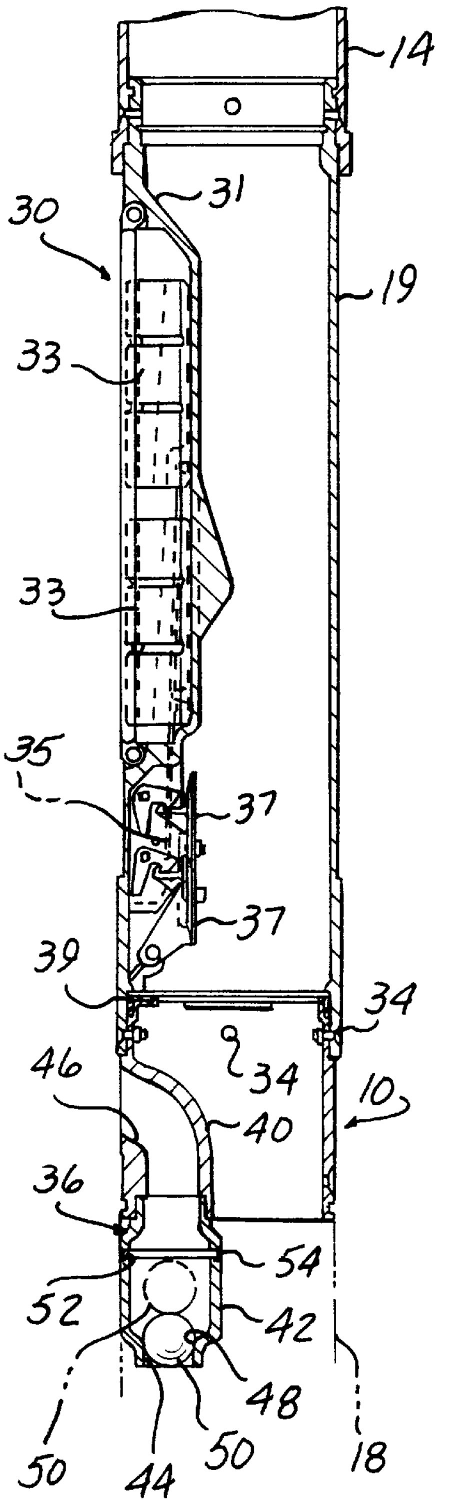
FIG. 3 is a side elevational view of the preferred embodiment incorporated with an auto limiter style overfill protection valve.
Figure 2:
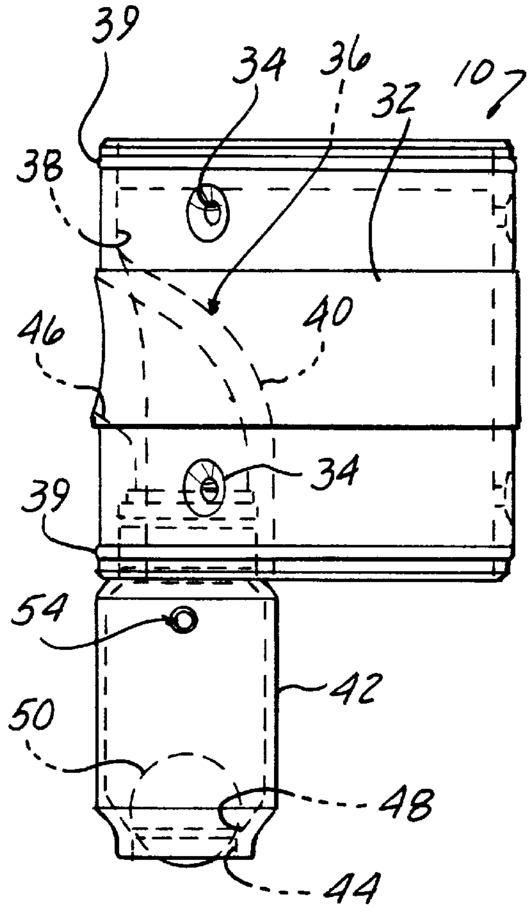
FIG. 2 is a side elevational view of the embodiment of the present invention.

In the embodiment of the present invention and referring to FIGS. 1–3, the air vent device designated generally 10 includes a cylindrical housing 12 adapted to be secured near or at the lower end of the fill pipe 14 to a storage tank 16. An elongated hollow drop tube 18 extends downwardly from the venting device 10 into the storage tank 16. The fill pipe 14 extends upwardly from the tank 16 to an upper end which is located within a relatively shallow manhole in the service station apron 20. A coupling member 22 is employed to couple the upper end of the fill pipe 14 to one end of the delivery hose 24 from the delivery truck 26. When a valve 28 at the delivery truck 26 is open, fuel flows by gravity from the delivery truck 26 through the outlet delivery hose 24 and coupling 22 to the top of the fill pipe 14. A quantity of air is held in the hose 24 of the delivery truck 26 before dispensing into the storage fuel tank 16. When the fuel flows by gravity from the delivery truck 26 to the outlet delivery hose 24, the quantity of air in the hose 24 precedes the fuel to enter through the outlet delivery hose 24, and coupling 22 to the top of the fuel pipe 14. Vapor expelled from the underground tank 16 during the filling of the tank is handled by a separate connection (not shown) to the head space of the tank. The air vent device of the present invention is readily adapted for use either in such a dual point vapor recovery system or a so-called co-axial vapor recovery system in which fuel vapor expelled during the filling operation passes upwardly through the annular passage between the outer side of drop tube 18 and the inside of fill pipe 14.

In the present case, the hydraulic connections between the coupling 22 and the fill pipe 14 are such that all of the air and fuel flowing into coupling 22 from the delivery hose 24 passes into the interior of an elongated drop tube 18 which projects freely downwardly through the fill pipe 14 well into the interior of the underground storage tank 16. In the preferred embodiment, a housing of the drop tube 19 of the overflow protection valve 30 is generally cylindrical having one side a recessed area 31 in the general midsection of the housing to accommodate an overfill protection valve 30 as disclosed in U.S. Pat. No. 5,388,622 and herein incorporated by reference. A hollow float 33 has slidable access along the exterior of the drop tube 18 in the recessed area 31. An actuating rod 35 couples the float 33 to a valve door 37 which moves in response to the movement of the float 33 between an open position (as seen in FIG. 3) to a closed position across the passageway in the drop tube 18. More than one float and valve door may be incorporated in the overfill protection valve 30.

The air vent device 10 as seen in FIG. 2, includes a cylindrical housing portion 32 having the same diameter as the drop tube 18 for abuttable attachment to the drop tube 18, for providing continuous fluid flow therethrough. The cylindrical housing portion 32 of the air vent device 10 is sealingly attached to the existing drop tube 18 by means of a rivet 34 and O-ring 39 assembly. A vent tube assembly 36 is positioned and attached adjacent to an inside wall 38 of the cylindrical housing portion 32. The vent tube assembly 36 includes a generally cylindrical tube 40 having an expansion chamber 42 proximate to one end. The cylindrical tube 40 has a J-shape configuration to direct the fluid from a vertical direction to a generally horizontal direction. The cylindrical tube 40 has two open ends. The first open end 44 is facing downwardly and forms a portion of the seat 48 for the expansion chamber 42. The second open end 46 is through the cylindrical housing portion 32 so that the passageway of the cylindrical tube 40 leads from the interior of the drop tube 18 to the upper portion of the storage tank 16.

Captured within the expansion chamber 42 is a float ball 50 made of a high density plastic material. A barrier which may be configured as a bar 54 traverses the expansion chamber 42 at a location spaced from seat 48. The bar 54 and seat 48 define the boundaries of the float ball 50 within the expansion chamber 42. The float ball 50 is shown in phantom against bar 54 in FIG. 3. During normal conditions, the float ball 50 is positioned on the seat 48 via gravity. At a distal end from the seat 48 is located another seat 52 of the expansion chamber 42. The second seat 52 is adjacent to and connected to the inner cylindrical tube 42. Beyond second seat 52, the cylindrical tube 42 has a curved configuration toward the opening 46 through the cylindrical wall portion 32 of the air vent device 10.

The bar 54 extends across the diameter of the expansion chamber 42. The bar 54 prevents the float ball 50 from raising above the barrier position so that gaseous and liquid fluid flow has access around the float ball 50, past upper seat 52, through the second open end 46 and out into the upper storage fuel tank 16. The float ball 50 is allowed to seat against the lower or first seat 48 of the expansion chamber 42 to prevent potential back pressure or increase in air pressure in the upper end of the storage tank 16 to back into the venting assembly and escape down the drop tube 18 into the lower end of the fuel tank, thereby causing turbulence. The float ball 50 also prevents vapor from escaping to the atmosphere by flowing to the drop tube 18 and then through an open manhole cover.

Therefore, during operation, when the fuel truck 26 begins to deliver fuel to the underground storage tank 16, the quantity of air that is trapped within the delivery hose 24 is first delivered to the fill pipe 14 prior to the liquid fuel. The trapped air assumes a path of least resistance. The air having a pressure of approximately 10–15 psi, exceeds the gravitational force on the lightweight float ball 50. The air will flow through the passageway of the air vent device 10 by raising the float ball 50 and flowing through the expansion chamber 42, through the cylindrical tube 40, and into the upper portion of the storage tank 16. The float ball 50 can only rise up to barrier bar 54 (as shown in phantom) so that air or other fluid may pass around the float ball 50 to flow into the upper portion of the storage tank 16. The liquid fuel having a higher density than the air will be pulled by gravity to flow down the drop tube 18 directly into the lower portion of the storage tank. Therefore, air mixture with the liquid fuel is kept to a minimum to virtually eliminate tank turbulence and to reduce vapor emissions.

The air vent device 10 as shown in FIG. 2 may be provided as a single unit for installation within a drop tube 18 to an underground storage tank 16. As an alternative, the air vent device 10 may be provided as integrally connected to a overflow protection valve 30 such as the auto limiter as shown in FIG. 3. If the air vent device 10 is integral with the overflow protection valve 60, the air vent device 10 is positioned below the overflow protection valve 30. Also as shown in FIG. 3, the air vent device 10 is positioned directly below the recessed area 31 of the overflow protection valve 30 so that there is a clear passageway adjacent the valve 30 and device 10 for the fuel. The positioning of the air vent device 10 in alignment below the overflow protection valve 30 minimizes the obstacles that the fuel flow encounters in the drop tube 18 which aids in minimizing further turbulence of the fuel.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. As examples of modifications the barrier may include other means from preventing float ball 50 seating against upper seat 52 such as a screen or basket weave barrier. In addition, the float ball 50 may be replaced with a flapper means lightly biased to close over open end 44 of the vent tube assembly. Finally, the air vent device 10 can eliminate an additional cylindrical housing 32 and the vent tube assembly can be retrofitted into an existing drop tube 18 by attaching the cylindrical tube 42 to the interior side wall of the drop tube 18 and providing a through aperture through the drop tube wall for the upper open end 46. The invention is intended to cover these and other various modifications.

What is claimed is:

1. A venting device connectible in a fill pipe in the top of an underground fuel storage tank, said venting device comprising:

- a cylindrical housing having a drop tube having an inner wall forming a fluid flow passageway, said fluid flow passageway having a fitting opening through the cylindrical housing to an upper level of the storage tank;
- means for securing the cylindrical housing to an end of the fill pipe;
- means for always permitting fluid flow from the drop tube through the fitting opening to an upper level of the storage tank; and
- means for preventing fluid flow from the upper level of the storage tank through the fitting opening to the drop tube.

2. The venting device of claim 1 wherein the inner wall forms a cylindrical tube having the fitting opening through the cylindrical housing at one end and a second opening in the drop tube.

3. The venting device of claim 2 further comprising an expansion chamber disposed between the fitting opening and the second opening of the cylindrical tube, the expansion chamber having a larger diameter than the diameter of the cylindrical tube.

4. The venting device of claim 3, wherein the expansion chamber is vertically disposed between the fitting opening and the second opening.

5. The venting device of claim 4 further comprising a float ball disposed in the expansion chamber.

6. The venting device of claim 5 wherein the expansion chamber has a first seat adjacent the second opening and a second seat at a distal end of the expansion chamber from the first seat.

7. The venting device of claim 6, wherein the float ball is biased to sit on the first seat.

8. The venting device of claim 7, wherein the means for always permitting fluid flow from the drop tube through the fitting opening to an upper level of the storage tank includes a barrier means for preventing the float ball from seating against the second seat.

9. The venting device of claim 8, wherein the barrier means includes a bar extending across the diameter of the expansion chamber for blocking the movement of the float ball, the barrier means disposed between the first and second seats of the expansion chamber.

10. A venting device in combination with an overfill shutoff valve, the overfill shutoff valve having an essentially cylindrical housing with one side of the housing having a recess area, a drop tube, a flow passage through the drop tube, a valve door movable between a valve door open position and a valve door closed position, a hollow float slidable upon the exterior of the drop tube in the recessed area of the housing and an actuating rod coupling the float to the valve door to move the valve door in response to the movement of the float, the venting device comprising:

a cylindrical housing connected to the essentially cylindrical housing of the overfill shutoff valve;

a drop tube integral with the drop tube of the overfill shutoff valve;

a cylindrical tubing disposed within and adjacent to an interior wall of the drop tube of the venting device, said cylindrical tubing having a first open end through said drop tube wall and a second open end in the drop tube of the venting device;

means for permitting fluid flow from the second open end to the first open end; and means for preventing fluid flow from the first open end to the second open end.

11. The combination of claim 10, wherein the cylindrical tubing is disposed directly below the recessed area of the housing.

12. The combination of claim 10, further comprising an expansion chamber disposed between the first and second open ends, the expansion chamber having a larger diameter than the diameter of the cylindrical tubing.

13. The combination of claim 12, further comprising a float ball disposed in the expansion chamber, wherein said float ball blocks the second opening to prevent fluid flow from the first open end to the second open end.

14. The combination of claim 13, further comprising barrier means to prevent the float ball from blocking the first open end.

* * * * *